(12) United States Patent
Watson (10) Patent No.: US 8,215,039 B2
(45) Date of Patent: Jul. 10, 2012

(54) ADVERTISING APPARATUS FOR AIRPLANE SERVICE CART

(76) Inventor: Robert T. Watson, Smithtown, NY (US)

( * ) Notice: Subject to any disclaimer, the term of this patent is extended or adjusted under 35 U.S.C. 154(b) by 801 days.

(21) Appl. No.: 12/004,987

(22) Filed: Dec. 21, 2007

(65) Prior Publication Data

US 2008/0172295 A1 Jul. 17, 2008

Related U.S. Application Data

(60) Provisional application No. 60/876,392, filed on Dec. 21, 2006.

(51) Int. Cl.
*G09F 3/00* (2006.01)
(52) U.S. Cl. ........ 40/308; 297/256.17; 40/617; 312/409
(58) Field of Classification Search ............... 40/654.01, 40/600, 606.04, 606.03, 606.05, 606.08, 40/610, 611.03–611.09, 611.01
See application file for complete search history.

(56) References Cited

U.S. PATENT DOCUMENTS

| | | | | |
|---|---|---|---|---|
| 2,845,731 A * | 8/1958 | Gaborsky, Jr. | ................... | 40/308 |
| 4,081,205 A * | 3/1978 | Rosenacker | ............... | 312/249.8 |
| 4,577,426 A * | 3/1986 | Jenkins | ........................... | 40/638 |
| 4,877,178 A | 10/1989 | Eisman | | |
| 5,333,909 A | 8/1994 | Hedge, Jr. et al. | | |
| 5,678,888 A * | 10/1997 | Sowell et al. | ............. | 297/256.17 |
| 6,425,649 B2 * | 7/2002 | Kasuya | ......................... | 312/409 |
| 7,398,611 B1 * | 7/2008 | Boxer et al. | ..................... | 40/537 |
| 2003/0159322 A1 | 8/2003 | Mead | | |
| 2005/0206155 A1 | 9/2005 | Porreca | | |

OTHER PUBLICATIONS

International Search Report, Int'l Application No. PCT/US2007/026189 dated Jun. 5, 2008.

* cited by examiner

*Primary Examiner* — Joanne Silbermann
*Assistant Examiner* — Shin Kim (57) ABSTRACT

An advertising apparatus for placement on a food cart or "duty free" cart permits the passenger to readily identify that "duty free" sale is taking place. The advertising apparatus also permit vendors and manufacturers of the "duty free" items to advertise their products directly on the cart for clear viewing by the passenger. It is further envisioned that the advertising apparatus may be mounted to the service cart at any time to enable third party advertising even when "duty free" sale is not taking place, e.g., during the distribution of food, snacks, meals etc. during the flight.

21 Claims, 10 Drawing Sheets

ADVERTISING APPARATUS FOR AIRPLANE SERVICE CART

CROSS-REFERENCE TO RELATED APPLICATIONS

This application claims the benefit of and priority to U.S. Provisional Patent Application Ser. No. 60/876,392 filed Dec. 21, 2006, the entire contents of which is hereby incorporated by reference herein.

BACKGROUND

1. Technical Field

The present disclosure generally relates to advertising instrumentalities and methodologies and, in particular, relates to an advertising apparatus for a food service or "duty free" cart to provide a means for third party vendors to advertise retail products and services, and/or facilitate immediate recognition of "duty free" sales during domestic and/or international flights.

2. Discussion of Related Art

Food service carts in airplanes are typically utilized to distribute food and drinks during a flight. In international flights, the food service or "duty free" cart may be used for "duty free" sale of goods, items, liquor, electronic equipment, etc.

One difficulty encountered with the "duty free" sale of items during a flight is the passenger's inability to recognize that such sale is taking place. In particular, during the "duty free" sale period, the flight attendant typically advances the food service cart down the aisle for potential sale of items to the passengers. However, the cart often is not recognizable to the passenger as a "duty free" cart for selling "duty free" items, but, in most instances, is viewed as a food cart for the mere distribution of food and drink items. Thus, the passenger has no advance notice of the ability to purchase items from the "duty free" cart. As a direct consequence, the sale of "duty free" items does not realize its potential during an air flight.

SUMMARY

Accordingly, the present disclosure is directed to an advertising apparatus for placement on a food cart or "duty free" cart to enable the passenger to readily identify that "duty free" sale is taking place. The advertising apparatus also permit vendors and manufacturers of the "duty free" items to advertise their products directly on the cart for clear viewing by the passenger. It is further envisioned that the advertising apparatus may be mounted to the service cart at any time to enable third party advertising even when "duty free" sale is not taking place, e.g., during the distribution of food, snacks, meals etc. during the flight.

In one embodiment, an apparatus for conveying information relating to commercial goods is adapted for use with a cart of the type used in commercial travel. The cart has a general box like appearance with a pair of side vertical cart walls, a pair of front and rear vertical cart walls and a recessed upper horizontal cart which defines a peripheral wall segment at least partially circumscribing the upper horizontal cart wall. The apparatus includes a plurality of generally flexible interconnected panels. The panels include a centrally positioned panel adapted for placement adjacent the upper horizontal cart wall and opposed longitudinal edges and opposed transverse edges, a pair of upper side panels adapted for placement adjacent the side vertical cart walls and having advertising media displayed on a viewing surface thereof, and first and second intermediate panels connecting each of the upper side panels with the centrally positioned panel. The first intermediate panel is foldably connected to the longitudinal edge of the centrally positioned panel and defines a width generally corresponding in dimension to a height of the peripheral wall segment of the cart. The second intermediate panel is foldably connected to the first intermediate panel and to the upper side panel and defines a width generally corresponding in dimension to the width of the peripheral wall segment of the cart. The dimensioning of the centrally positioned panel and the first and second intermediate panels permits the interconnected panels to be placed in juxtaposed relation to the walls of the cart with minimal extension of the interconnected panels beyond the cart's dimensioning. Furthermore, the interconnected panels are adapted to fold onto each other to assume a folded condition for storage within a shelf of the cart.

A pair of lower side panels may be foldably connected to the upper side panels with at least one of the lower side panels having advertising media displayed on a viewing surface thereof. At least one of the upper side panels may include a pocket which defines an access opening for selective reception and removal of an advertising insert. At least some of the adjacent panels may be interconnected through a plurality of discrete and spaced connecting tabs which are separated by slots. The connecting tabs are dimensioned to displace the adjacent panels relative to each other to facilitate folding of the adjacent panels.

The centrally positioned panel may extend along substantially the length of the upper horizontal wall of the cart. A front panel may be foldably connected adjacent one of the transverse edges of the central panel and adapted for positioning against the front vertical cart wall. With this arrangement, third and fourth intermediate panels may connect the centrally positioned panel and the front panel. The third intermediate panel is foldably connected to the transverse edge of the centrally positioned panel and defines a width generally corresponding in dimension to a height of the peripheral wall segment of the cart. The fourth intermediate panel is foldably connected to the third intermediate panel and to the front panel and defines a width generally corresponding in dimension to the width of the peripheral wall segment of the cart. The front panel may include advertising media displayed on a viewing surface thereof. A second front panel may be foldably connected to the first mentioned front panel.

The panels may be encapsulated within a polymeric overlay.

An advertising method for conveying advertising information on a cart of the type used in air travel with the apparatus is also disclosed.

BRIEF DESCRIPTION OF THE DRAWINGS

The accompanying drawings, which are incorporated in and constitute a part of this specification, illustrate embodiments of the disclosure and, together with a general description of the disclosure given above, and the detailed description of the embodiment(s) given below, serve to explain the principles of the disclosure, wherein:

FIGS. 8A-8D are a sequence of views illustrating one methodology for folding the advertising apparatus of FIG. 6 for placement within a shelf of the duty free cart;

DETAILED DESCRIPTION

Figure 1:
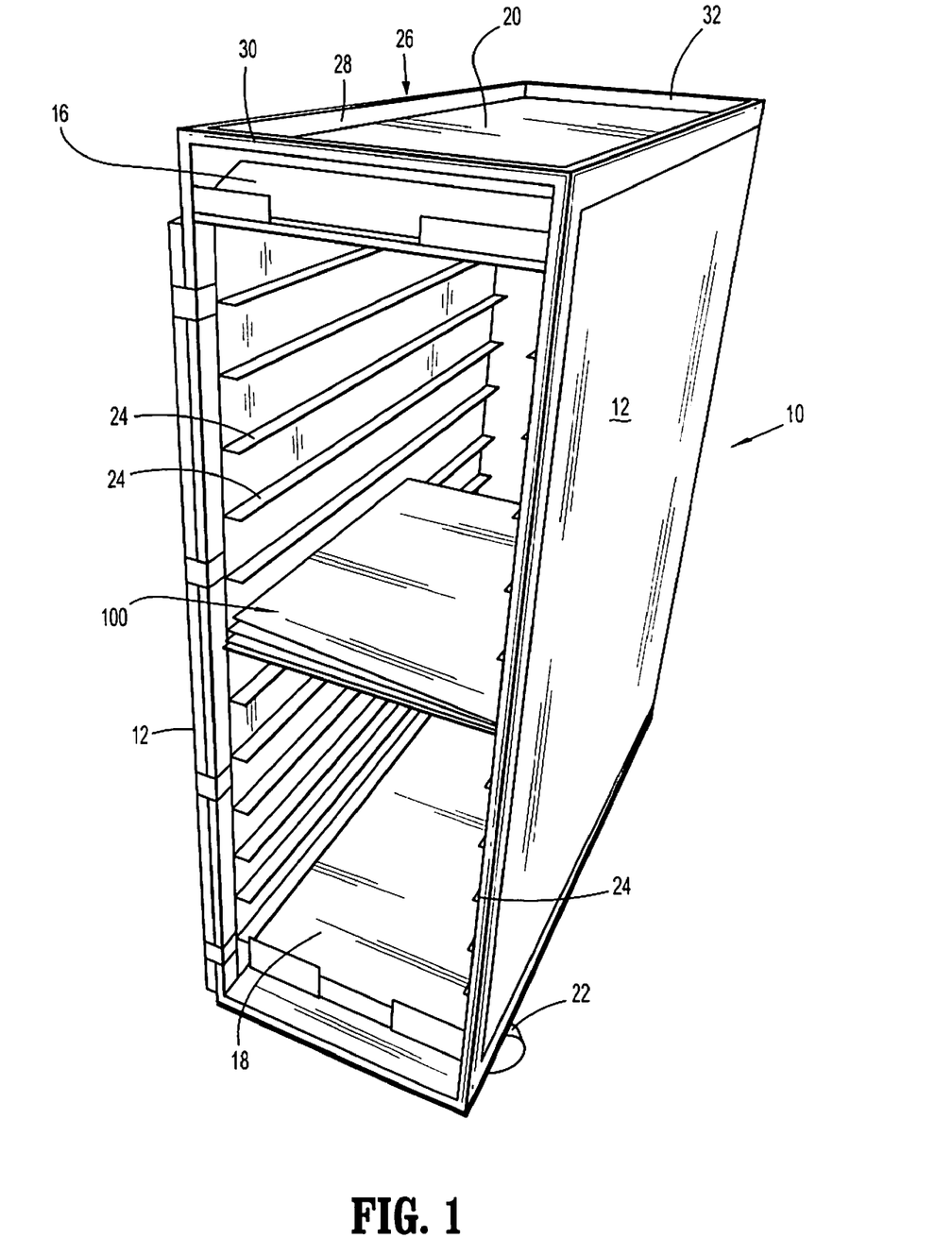
FIG. 1 is a perspective view of a conventional duty free or food cart utilized during air travel and further illustrating the advertising apparatus in accordance with one embodiment of the present disclosure in a folded condition and positioned within one of the shelves in the cart.

Referring now to the drawings attached hereto wherein like reference numerals identify similar or like components throughout the several views. FIG. 1 illustrates the advertising apparatus for use with a food cart or "duty free" cart in accordance with the present disclosure. FIG. 1 depicts a conventional food or "duty free" cart utilized on an airplane. The cart, identified generally by reference numeral 10, is box like in appearance and consists of a pair of side vertical panels or cart walls 12, a vertical rear cart wall 14 and a vertical front cart wall 16. The vertical front cart wall 16 is typically retractable to open and close to permit access to the interior of the cart 10. The cart 10 further includes lower and upper horizontal walls 18, 20, and may be mounted on rollers 22 or the like to facilitate transport, e.g., down the vessel's aisle. Disposed within the interior of the cart is a plurality of opposed horizontal rails 24 which accommodate shelving or trays to support the items within the cart.

Upper horizontal wall 20 is typically recessed relative to side walls 12, rear wall 14 and front wall 16 to define peripheral wall segment 26 circumscribing the upper horizontal wall 20. Peripheral wall segment 26 is inclusive of side wall segments 28 and front and rear wall segments 30, 32. Peripheral wall segment 26 defines a peripheral boundary for upper horizontal wall 20 to assist in retaining food articles on the upper horizontal wall 20 when cart 10 is used to service passengers in its normal capacity.

Although the configuration of commercially available duty free carts are substantially similar for most airlines, the dimensioning of the carts may differ slightly. For exemplative purposes, the height, depth and width of the cart may range as follows:

a) height from about 30 inches to about 45 inches;
b) depth from about 15 inches to about 25 inches; and
c) width ranging from about 8 inches to about 14 inches.

FIG. 1 illustrates the advertising apparatus 100 in a fully folded condition and positioned on opposed rails 24 within cart 10. As shown, the dimensioning of apparatus 100 in the folded condition is selected to generally approximate at least the width of the interior of cart 10 to fit neatly within the cart 10 on a single shelf defined by rails 24.

Figure 2:
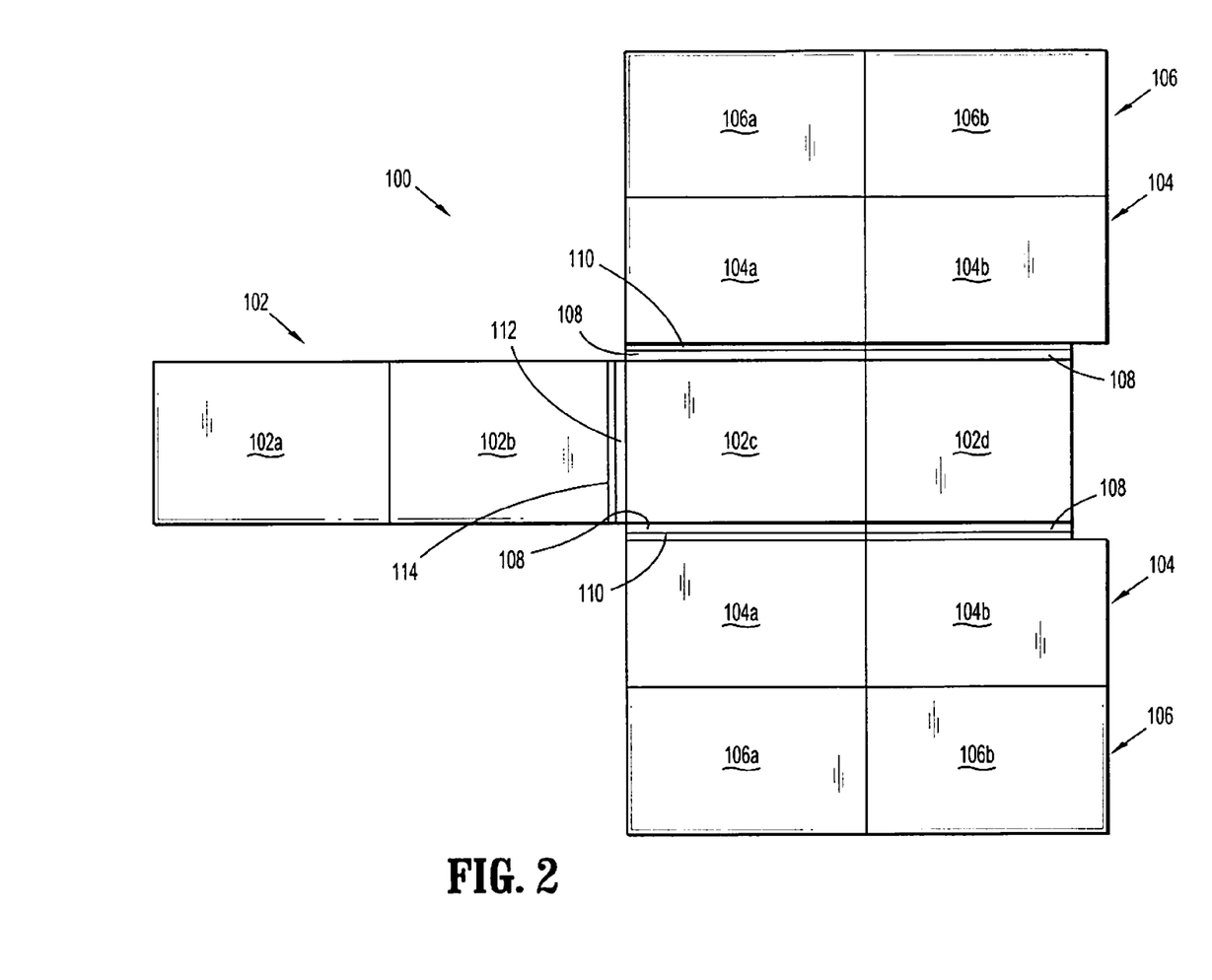
FIG. 2 is a plan view of the advertising apparatus illustrating the panels in a fully unfolded condition.

With reference now to FIG. 2, the advertising apparatus 100 will be discussed. FIG. 2 depicts the advertising apparatus 100 in plan view and in a fully unfolded condition. Advertising apparatus 100 includes a plurality of panels foldably connected to each other and adapted to fold onto each other to assume a generally flat panel folded condition for storage as illustrated in FIG. 1. In one embodiment, advertising apparatus 100 includes first centrally positioned row 102 of four panels 102a, 102b, 102c, 102d, and second and third rows 104, 106 of the panels on each side of the centrally positioned row 102. Each second row 104 includes two panels 104a, 104b which are connected to respective panels 102c, 102d of the first centrally positioned row 102. Each third row 106 includes two panels 106a, 106b which are connected to respective panels 104a, 104b of the second rows 104. Each of the connected panels of the first, second and third rows 102, 104, 106 may be connected to respective adjacent panels by fold lines and, in some instances, double fold or hinge lines. For example, centrally positioned panels 102c, 102d are each respectively connected to panels 104a, 104b of second row 104 through a set of first and second intermediate panels 108, 110. In particular, centrally positioned panels 102c, 102d are foldably connected along their respective longitudinal edges to first intermediate panels 108. Second intermediate panels 110 are foldably connected to first intermediate panels 108 and panels 104a, 104b along respective longitudinal edges thereof. In addition, panel 102b is connected to panel 102c of first row 102 through third and fourth intermediate panels 112, 114. It is noted that in one embodiment, adjacent panels 104a, 104b are not connected to each other, and, similarly, adjacent panels 106a, 106b are not connected to each other. Furthermore, first, second, third and fourth intermediate panels 108, 110, 112, 114 may be subdivided into two sections along e.g., their respective midlines. This arrangement may facilitate folding of advertising apparatus 100 upon itself to assume its folded condition.

The particular dimensioning of the panels of apparatus 100 may be varied in accordance with the size of cart 10, and are intended to generally correspond to the respective dimensions of the walls of the cart 10 upon which the panels are to be positioned. However, in one preferred embodiment, panels 102c, 102d preferably define a width corresponding to the width of upper horizontal cart wall 20. In addition, first intermediate panel 108 may defines a width generally approximating the height of side wall segment 28 of peripheral wall segment 26 and second intermediate panel 110 may define a width generally approximating the width of side wall segment 28. Similarly third and fourth intermediate panels 110, 112 define respective widths approximating the height and width of front or rear wall segment 30, 32 of peripheral wall segment 26.

Advertising apparatus 100 may be formed from a sheet(s) of SBS bituminous material, polyethylene films, corrugated cardboard, a polymeric material, Tyvek etc, or any other suitable material having some rigidity to withstand normal wear and tear encountered during use. The panels may have a gloss or laminate coating. The panels are preferably die cut to the predetermined dimensions. The single and double fold lines forming first, second, third and fourth intermediate panels 108, 110, 112, 114 may also be die cut and may be in the form of perforated score lines or the like. In the alternative, the panels may be interconnected through living hinges or the like. In one embodiment, the panels are relatively flexible.

Figure 3:
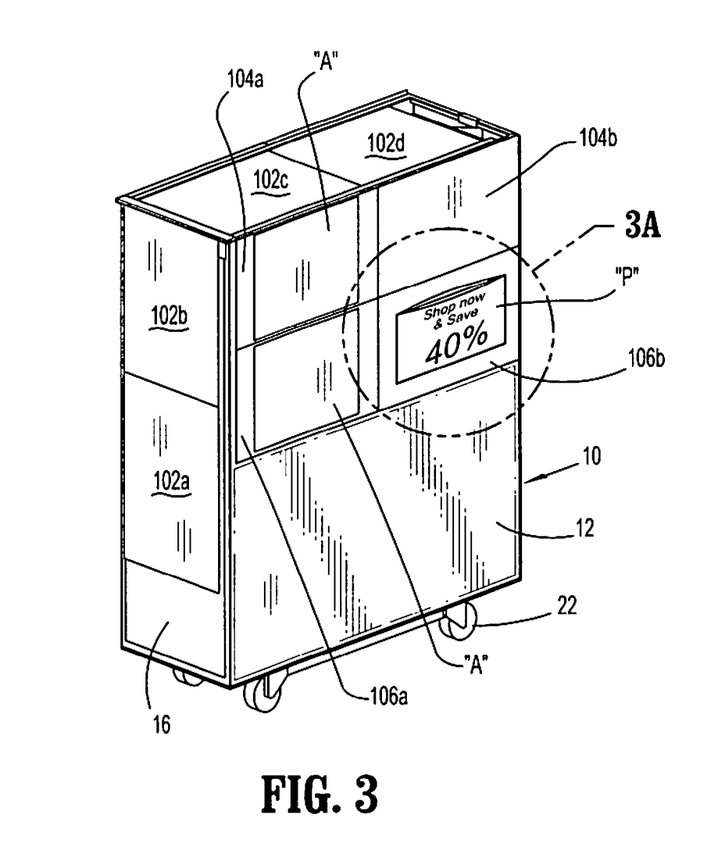
FIG. 3 is a perspective view illustrating the advertising apparatus positioned on the duty free cart.
Figure 4:
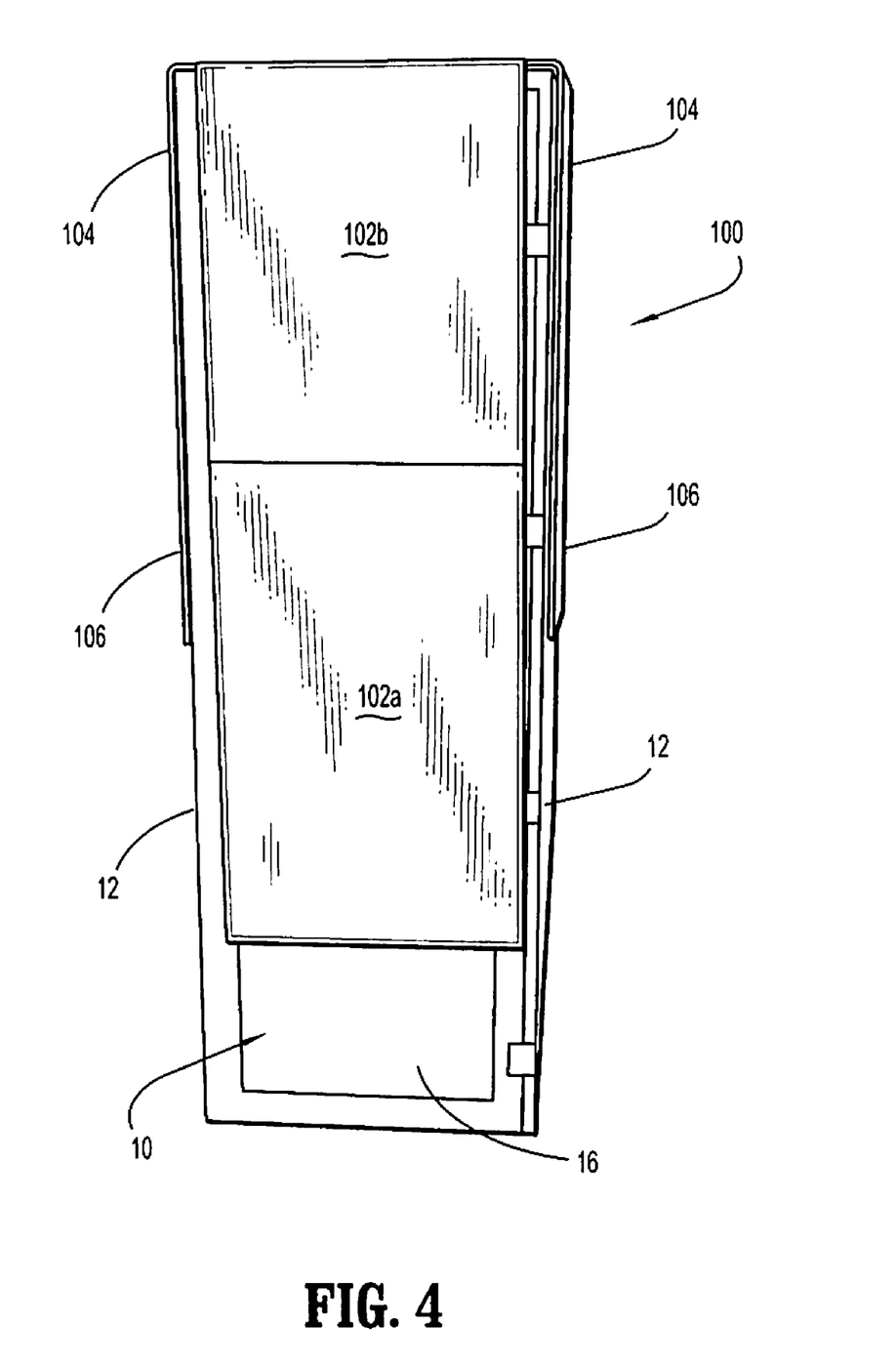
FIG. 4 is a plan view of the advertising apparatus illustrating the panels residing on the front or rear cart wall of the duty free cart.
Figure 5:
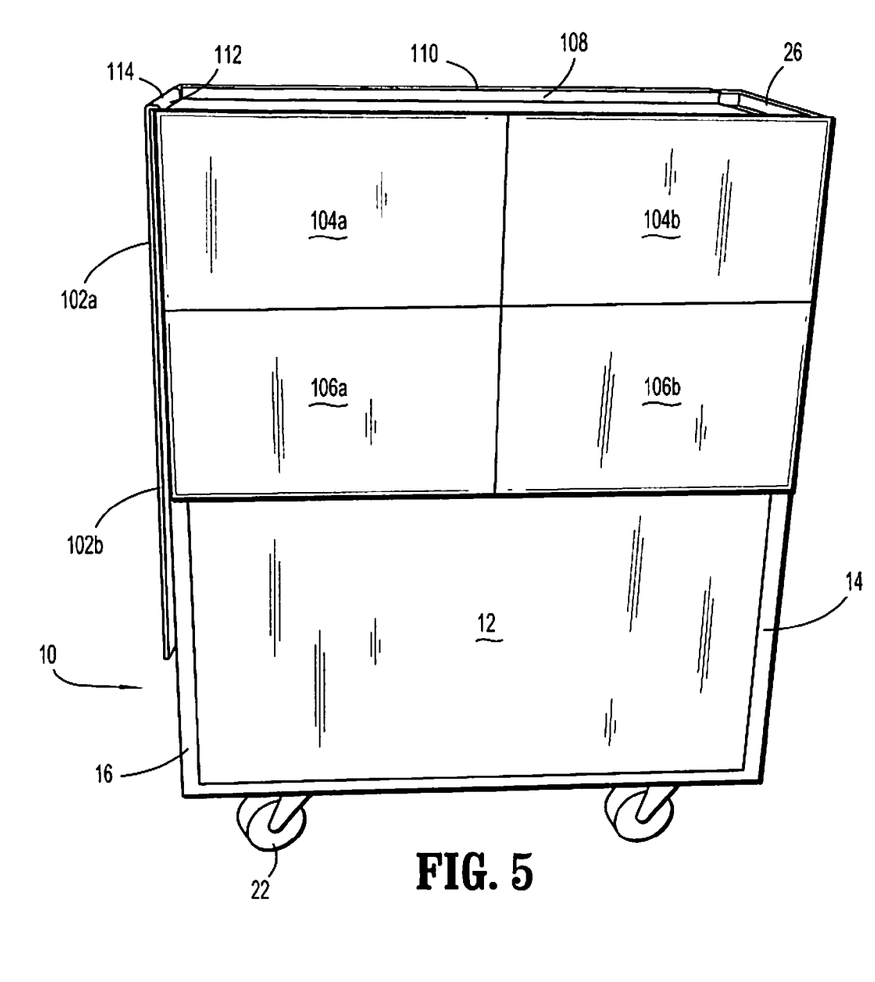
FIG. 5 is a plan view of the advertising apparatus illustrating the panels residing on a side cart wall of the duty free cart.

FIGS. 3-5 illustrate the advertising apparatus 100 mounted on the cart 10. As shown, panels 102c, 102d of the first centrally positioned row 102 of panels are positioned on the upper horizontal cart wall 20 while remaining panels 102a, 102*b* fold along third and fourth intermediate panels 110, 112 to rest upon the front cart wall 16 or optionally, on rear vertical cart wall 14. Second row 104 of the panels fold along first and second intermediate panels 108, 110 to rest upon the vertical side cart walls 12 as shown, and the third rows 106 of panels depend from the respective second rows 104 of panels also to be positioned on the vertical side cart walls 12. The particular dimensioning of first, second, third and fourth intermediate panels 108, 110, 112, 114 correspond to the height and width of the peripheral wall segments 28, 30 to thereby ensure that apparatus 100 is draped about the cart 10 in juxtaposed relation with the cart walls 12, 14, 16, 20 with minimal extension of the interconnected panels beyond the carts dimensions, and permits panels 102*c*, 102*d* to reside flat against upper horizontal cart wall 20. This facilitates securement of the apparatus 100 on cart 10 and transport and manipulation of the cart 10 about the vessel.

Panels 104*a*, 104*b*, 106*a*, 106*b* may incorporate advertising indicia or information positioned on a viewing surface to be clearly viewed by the passenger during maneuvering of the cart 10 along the aisle. Moreover, any of the panels may have an advertisement "A" associated therewith to permit vendors to advertise as desired. Alternatively, the panels or placards may serve as the advertising medium upon which the advertisements, logos etc. are printed or drawn. As a further alternative, any of the panels may incorporate transparent pockets 116 having an access opening 118 to receive advertising brochures or placards. One such pocket 116 is depicted in the isolated view of FIG. 3A and may incorporate a transparent material affixed to the respective panel along three sides of the pocket 116.

Figure 3A:
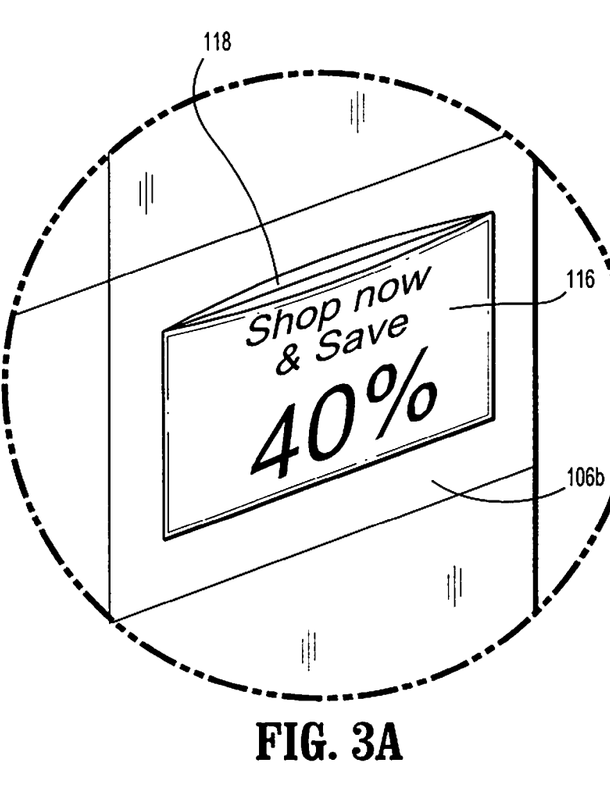
FIG. 3A is an enlarged isolated view of the area of detail indicated in FIG. 3.

In addition, panels 102*a*, 102*b* may also include advertising information and/or writing or symbols or a pocket 116 with associated advertising placard "p". When panels 102*a*, 102*b* are positioned on front cart wall 16, the advertisements will readily apprise passengers of the upcoming duty free sales period.

Another feature of the present disclosure is the ability to fold the advertising apparatus 100 onto itself to form an arrangement where the panels are in folded superposed relation. FIG. 1 illustrates the fully folded condition of the advertising apparatus 100. In addition, the panels of the advertising apparatus are preferably dimensioned whereby, in the folded condition, the advertising apparatus 100 may be stored within one of the shelving units defined by rails 24 of the cart 10 thereby enhancing storage and usability of the apparatus. It is further envisioned that a container or package cover may receive or be positioned about the folded advertising apparatus 100 to preserve the condition thereof.

Thus, the advertising apparatus of the present disclosure may be placed on the food cart during normal distribution of meals snacks, etc to provide a means for vendors of the like to advertise within the airplane. Additionally, or in the alternative, the advertising apparatus may be mounted on the "duty free" cart prior to "duty free" service. This will advantageously alert the passenger to "duty free" purchasing availability as the passenger views the cart move down the aisle. Furthermore, specific items available for purchase may be advertised on the panels of the advertising apparatus. It is further envisioned that the respective airline could use the advertising apparatus as a medium to announce travel information, reduced fair rates, etc. . . .

Figure 6:
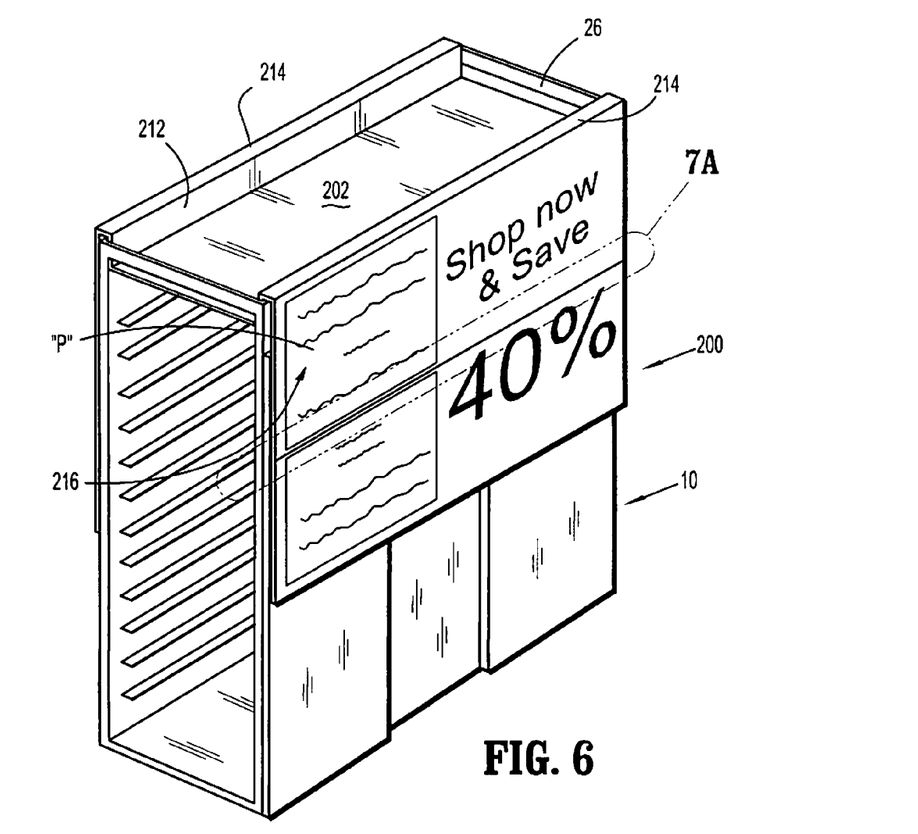
FIG. 6 is a perspective view of an advertising apparatus in accordance with another embodiment of the present disclosure and positioned on a duty free cart.
Figure 7:
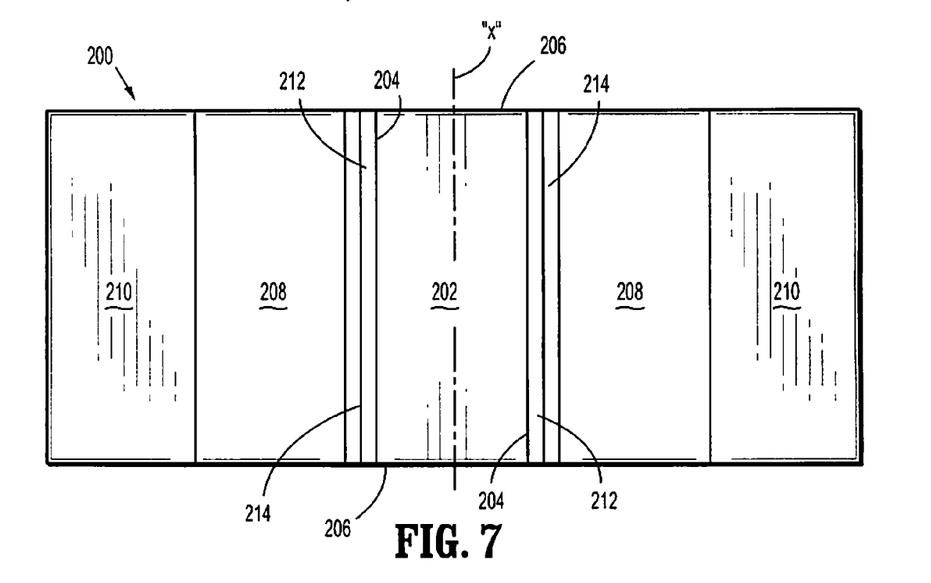
FIG. 7 is a plan view of the advertising apparatus of FIG. 7 illustrating the panels in the fully unfolded condition.

Referring now to FIGS. 6-7, there is illustrated another embodiment of the present disclosure. Advertising apparatus 200 includes single central panel 202 defining longitudinal axis "x", and having longitudinal edges 204 and transverse edges 206. Apparatus 200 further includes upper side panel 208 and lower side panel 210. Upper side panel 208 is connected to central panel 202 through first and second intermediate panels 212, 214.

In accordance with this embodiment, central panel 202 defines a length and width generally approximating the length and width of horizontal cart wall 20 to fit substantially precisely within the confines of peripheral cart wall segment 26. Similar to the first embodiment of FIG. 1, the respective widths of first and second intermediate panels 212, 214 generally approximate the height and width of peripheral cart wall segment 26 depending above horizontal cart wall 20 to snugly fit in juxtaposed relation with the wall segments as best depicted in FIG. 6.

Advertising apparatus 200 may be adapted for a cart 10 of different dimensions than the cart of FIG. 1. For example, each of panels 202, 208, 210, 212, 214 may define similar longitudinal lengths, e.g., ranging from about 26 inches to about 30 inches. The width of central panel 202 may range from about 10 inches to about 14 inches and the widths of upper and lower side panels 208, 210 may range from about 10 inches to about 14 inches. Either or both of upper and lower side panels 208, 210 may incorporate at least one pocket 216 for removably receiving a placard "p".

Figure 7A:
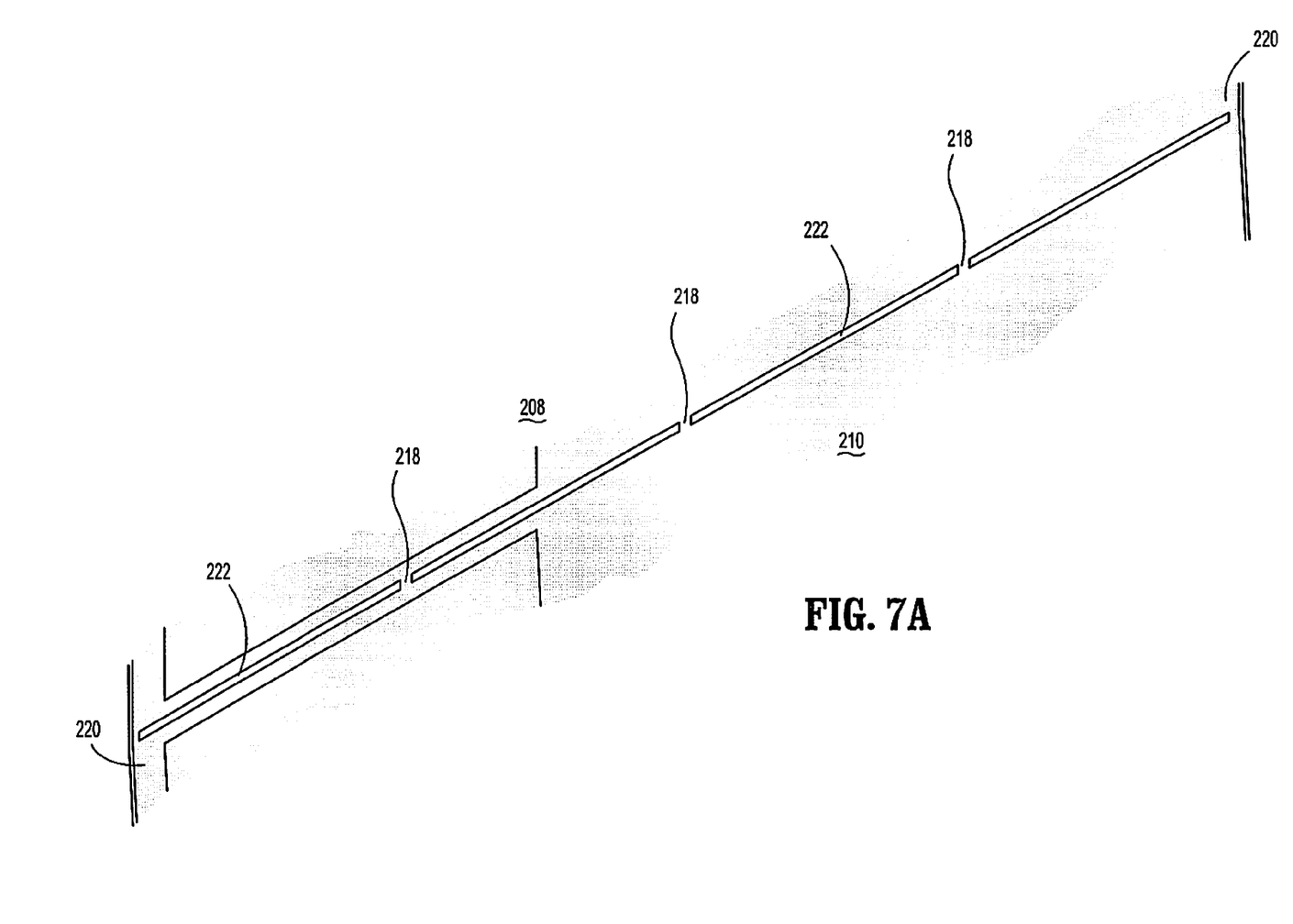
FIG. 7A is an enlarged isolated view of the area of detail indicated in FIG. 6.

FIG. 7A illustrates one preferred methodology for connecting each of panels of apparatus 200. In particular, adjacent panels of apparatus 200 are preferably connected by a plurality, e.g., three or more connecting tabs 218 extending between the adjacent panels which, in the illustration, includes upper and lower side panels 208, 210. Connecting tabs 218 are discrete and are disposed in longitudinal spaced relation between the panels. Connecting tabs 218 are of sufficient length to displace respective adjacent panels 208, 210 relative to each other. This arrangement facilitates folding of the adjacent panels 208, 210 to their folded condition. In one embodiment, some, possibly, all, of the panels 202, 208, 210, 212, 214 are connected to their respective adjacent panels by connecting tabs 218.

Panels 202, 208, 210, 212, 214 may be encased within a polymeric laminate which provides structural stability, and significantly increases the shelf life of apparatus 200 permitting, e.g., the apparatus 200, to be reused a number of times. The laminate encasing preferably provides an outer peripheral sealed edge 220 or extension beyond the peripheries of the panels which further protects the panels from damage. The sealed edge 220 is best disclosed in FIG. 7B. The laminate may extend over slots 222 defined between adjacent tabs 218.

Figure 8A:
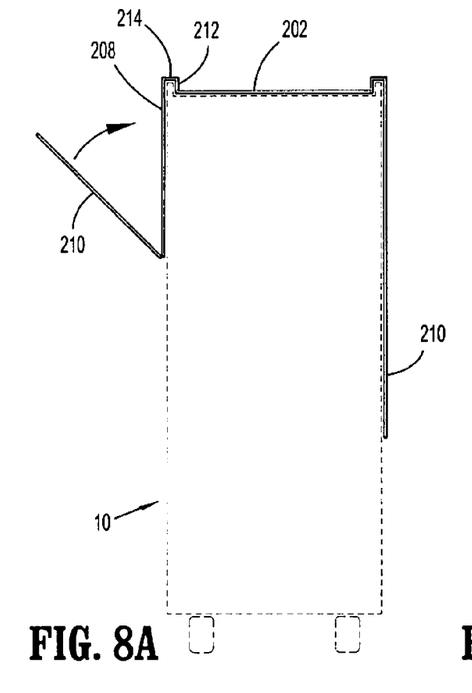
Figure 8B:
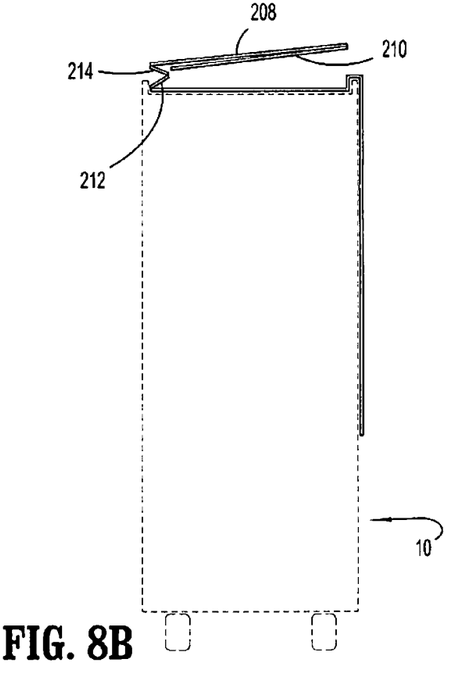
Figure 8C:
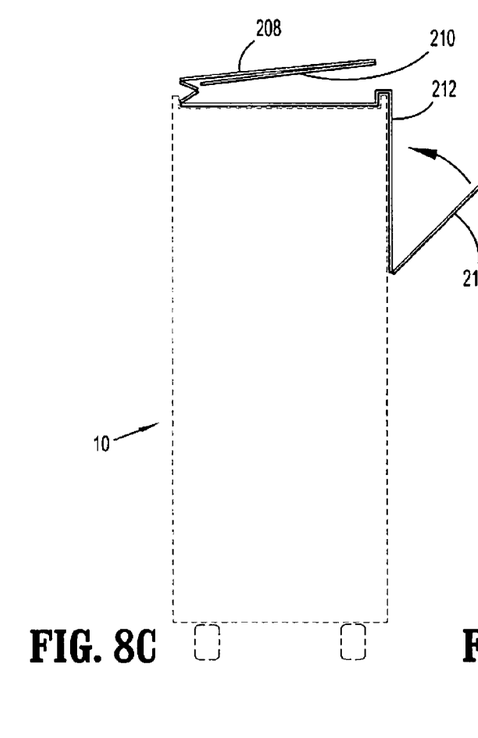
Figure 8D:
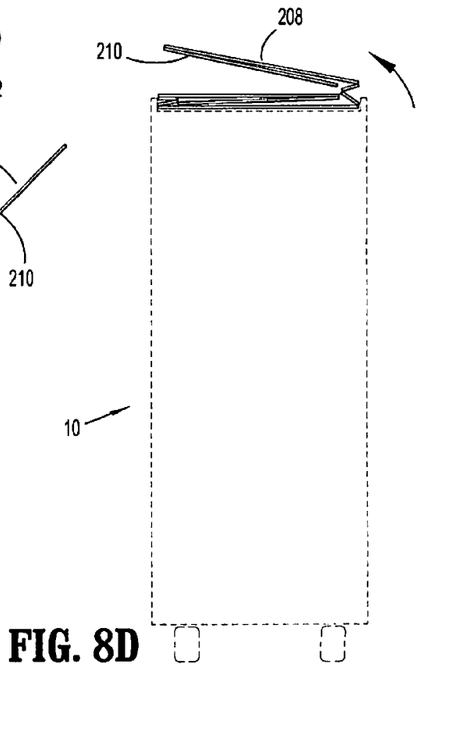

FIGS. 8A-8B illustrates one sequence of steps of folding apparatus 200 to assume the folded condition for storage within cart 10. Initially, lower side panel 210 adjacent a first side of the duty free cart 10 is folded along connecting tabs 218 and slots 222 onto upper panel 208 as shown in FIG. 8A. The folded lower and upper side panels 208, 210 are then folded along second intermediate panel 214 and the first and second intermediate panels 212, 214 collapse upon each other as depicted in FIG. 8B. The procedure is continued on the other side of the cart 10 through the sequence of folds depicted in FIGS. 8C-8D. In the fully folded condition, panels of apparatus 200 are substantially in juxtaposed relation and fit within the peripheral confines of peripheral wall segment 26 on horizontal cart wall 20. The folded apparatus 200 may be stored within peripheral segment 26 on horizontal cart wall 20 or on a shelf defined by opposed rails 24 of cart 10 in a similar manner to that described in with the embodiment of FIG. 1 where the apparatus 200 will be available for subsequent use.

Figure 9:
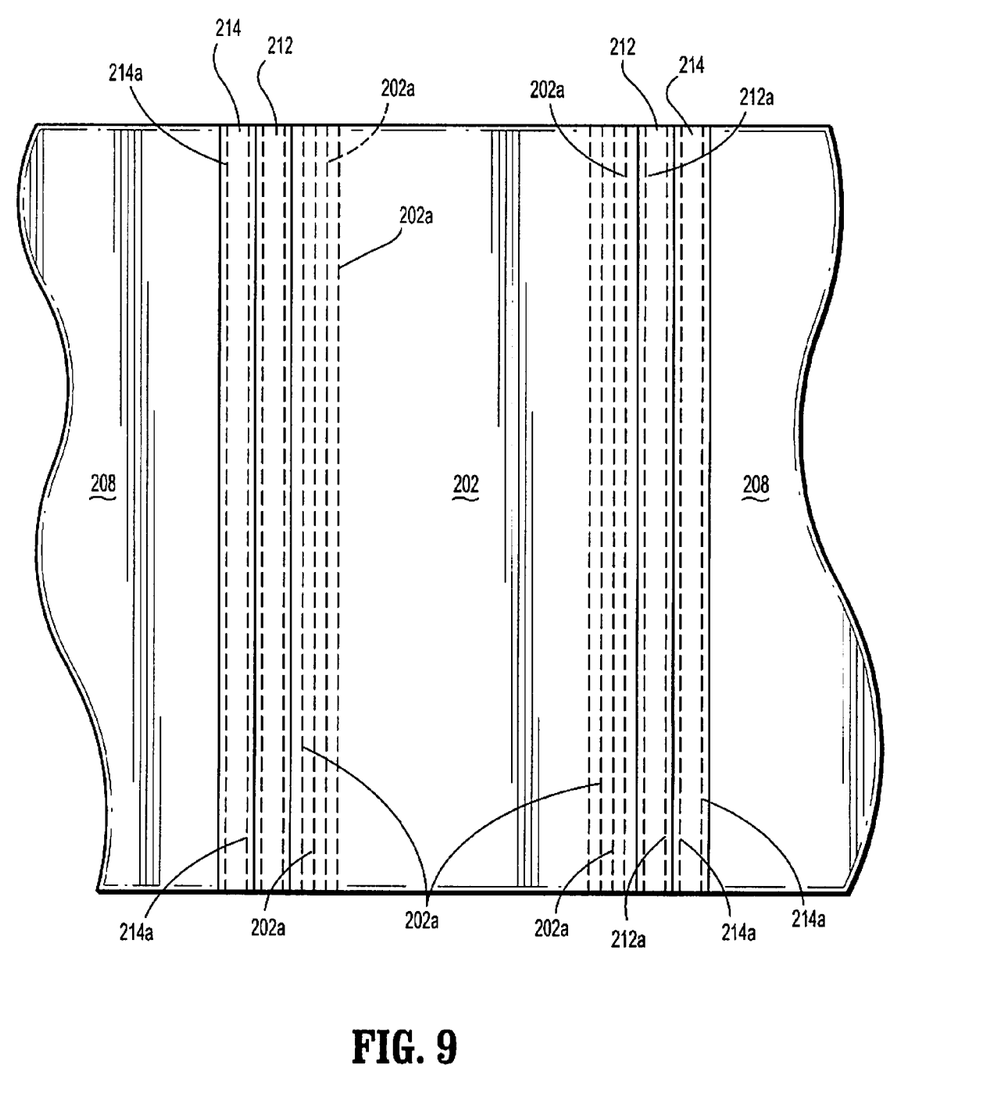
FIG. 9 is an enlarged view of a section of another alternate embodiment of the advertising apparatus of the present disclosure.
Figure 10:
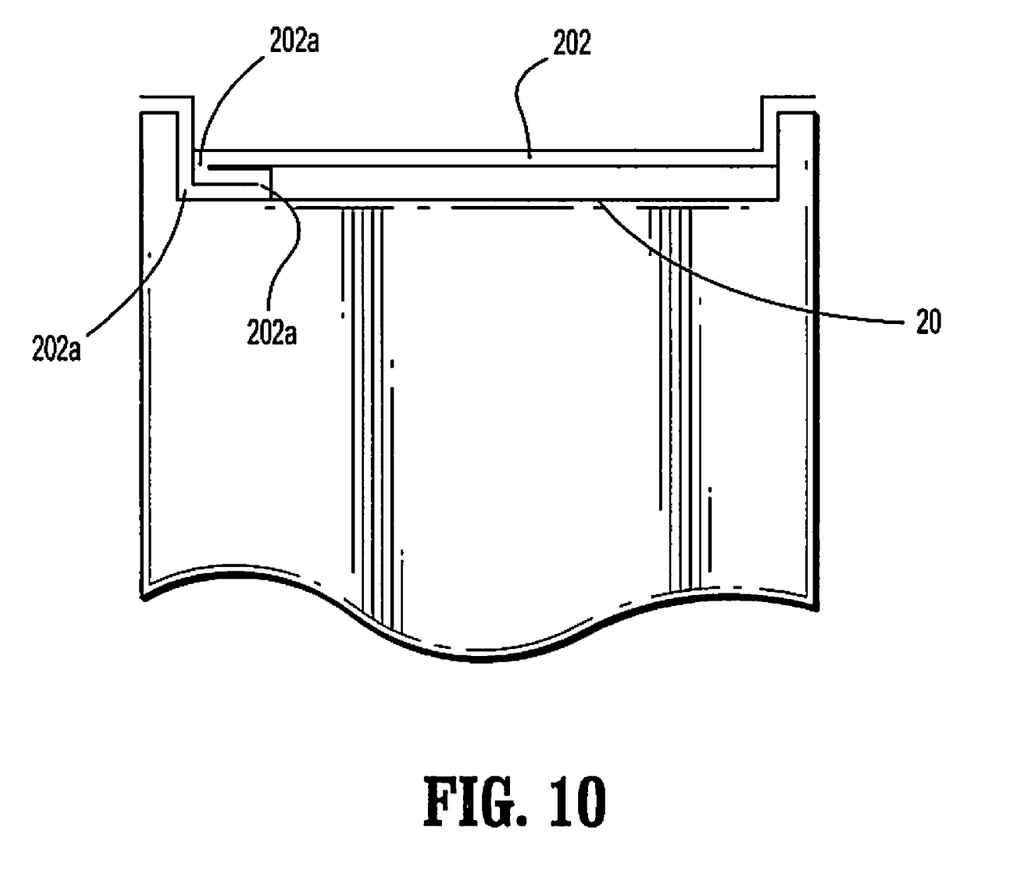
FIG. 10 is a view illustrating a methodology of folding the advertising apparatus of FIG. 9.

FIG. 9 illustrates another alternate embodiment of the present disclosure. This embodiment is substantially similar to the embodiment of FIGS. 6-8. However, in accordance with this embodiment, panel 202 and first and second intermediate panels 212, 214 each include at least one, preferably, a plurality of fold lines. For example, central panel 202 may include additional fold lines 202a adjacent each longitudinal edge 204, and first and second intermediate panels 212, 214 may include respective additional fold lines 212a, 214a. Fold lines 202a enhance adaptability of central panel 202 to a variety of sizes or different widths of upper horizontal wall 20 depending on the size of or type of cart used. Thus, if central panel 202 is too large in width for the upper horizontal wall 20, the central panel may be folded along at least one fold line 202a to fit within opposed peripheral wall segments 28 of the cart as, e.g., depicted in FIG. 10. Fold lines 202a may be spaced at predetermined distance or increments. Similarly, fold lines 212a, 214a of first and second intermediate panels 212, 214 enhance adaptability of panels 212, 214 to peripheral wall segment 28 having different heights or widths depending on the cart type and size. It is further envisioned that fold lines may be incorporated into third and fourth intermediate panels 112, 114 in the embodiment of FIG. 1 to accommodate variations in the width and height of wall segment 30.

The advertising apparatus and method of use thereof may be used in conjunction with a food cart or "duty free" cart on an airplane or any other means of transportation including ships, trains, buses, or any other commercial or personal modes of transportation.

Although the illustrative embodiments of the present disclosure have been described herein with reference to the accompanying drawings, it is to be understood that the disclosure is not limited to those precise embodiments, and that various other changes and modifications may be effected therein by one skilled in the art without departing from the scope or spirit of the disclosure. For example, one or more of the panels may be removed, altered in dimension or size, relocated, etc. It is appreciated, that the present disclosure is not to be limited to the number of rows, panels and dimensions thereof identified in FIG. 2, or FIG. 7 but, rather, may assume other configurations, sizes, numbers of rows and panels and still achieve the objectives of the present disclosure.

What is claimed is:

1. An apparatus for conveying information relating to commercial goods, and adapted for use with a cart of the type used in commercial travel, the cart having a general box like appearance with a pair of side vertical cart walls, a pair of front and rear vertical cart walls and a recessed upper horizontal cart which defines a peripheral wall segment at least partially circumscribing the upper horizontal cart wall, the apparatus comprising:

a plurality of generally flexible interconnected panels with at least some of adjacent panels being interconnected through a plurality of discrete and spaced connecting tabs separated by slots, the connecting tabs dimensioned to displace the adjacent panels relative to each other to facilitate folding of the adjacent panels, including:

a centrally positioned panel adapted for placement adjacent the upper horizontal cart wall, the first centrally positioned panel defining a longitudinal axis and having opposed longitudinal edges and opposed transverse edges;

a pair of upper side panels adapted for placement adjacent the side vertical cart walls, the upper side panels having advertising media displayed on a viewing surface thereof; and first and second intermediate panels connecting each of the upper side panels with the centrally positioned panel, the first intermediate panel foldably connected relative to the longitudinal edge of the centrally positioned panel and defining a width generally corresponding in dimension to a height of the peripheral wall segment of the cart, the second intermediate panel foldably connected relative to the first intermediate panel and to the upper side panel and defining a width generally corresponding in dimension to the width of the peripheral wall segment of the cart;

whereby the dimensioning of the centrally positioned panel and the first and second intermediate panels permits the interconnected panels to be placed in juxtaposed relation to the walls of the cart with minimal extension of the interconnected panels beyond the cart's dimensioning.

2. The apparatus according to claim 1 including a pair of lower side panels foldably relative connected to the upper side panels, at least one of the lower side panels having advertising media displayed on a viewing surface thereof.

3. The apparatus according to claim 2 wherein at least one of the upper side panels includes a pocket, the pocket defining an access opening for selective reception and removal of an advertising insert.

4. The apparatus according to claim 1 wherein the centrally positioned panel extends along substantially the length of the upper horizontal wall of the cart.

5. The apparatus according to claim 1 including a front panel foldably connected adjacent one of the transverse edges of the central panel and adapted for positioning against the front vertical cart wall.

6. The apparatus according to claim 5 including third and fourth intermediate panels connecting the centrally positioned panel and the front panel, the third intermediate panel foldably connected relative to the transverse edge of the centrally positioned panel and defining a width generally corresponding in dimension to a height of the peripheral wall segment of the cart, the fourth intermediate panel foldably connected relative to the third intermediate panel and to the front panel and defining a width generally corresponding in dimension to the width of the peripheral wall segment of the cart.

7. The apparatus according to claim 5 wherein the front panel includes advertising media displayed on a viewing surface thereof.

8. The apparatus according to claim 5 wherein including a second front panel foldably connected relative to the first mentioned front panel.

9. The apparatus according to claim 1 wherein the panels are encapsulated within a polymeric overlay.

10. An apparatus for conveying information relating to commercial goods, and adapted for use with a cart of the type used in commercial travel, the cart having a general box like appearance with a pair of side vertical cart walls, a pair of front and rear vertical cart walls and a recessed upper horizontal cart which defines a peripheral wall segment at least partially circumscribing the upper horizontal cart wall, the apparatus comprising:

a plurality of generally flexible interconnected panels with at least some of adjacent panels being interconnected through a plurality of discrete and spaced connecting tabs separated by slots, the connecting tabs dimensioned to displace the adjacent panels relative to each other to facilitate folding of the adjacent panels foldably, including:

a centrally positioned panel adapted for placement adjacent the upper horizontal cart wall, the first centrally positioned panel defining a longitudinal axis and having opposed longitudinal edges and opposed transverse edges, the centrally positioned panel includes a plurality of fold lines to selectively vary the width of the centrally positioned panel to be received within the peripheral wall segment of the cart;

a pair of upper side panels adapted for placement adjacent the side vertical cart walls, the upper side panels having advertising media displayed on a viewing surface thereof; and first and second intermediate panels connecting each of the upper side panels with the centrally positioned panel, the first intermediate panel foldably connected to the longitudinal edge of the centrally positioned panel and defining a width generally corresponding in dimension to a height of the peripheral wall segment of the cart, the second intermediate panel foldably connected to the first intermediate panel and to the upper side panel and defining a width generally corresponding in dimension to the width of the peripheral wall segment of the cart;

whereby the dimensioning of the centrally positioned panel and the first and second intermediate panels permits the interconnected panels to be placed in juxtaposed relation to the walls of the cart with minimal extension of the interconnected panels beyond the cart's dimensioning and wherein the interconnected panels are adapted to fold onto each other to assumed a folded condition for storage within a shelf of the cart.

11. The apparatus according to claim 1 wherein the first and second intermediate panels each includes a plurality of fold lines to selectively vary the width of the respective first and second intermediate panels to accommodate variations in the height and width of the peripheral wall segment of the cart.

12. An advertising method for conveying advertising information on a cart of the type used in air travel, the cart having a general box like appearance with a pair of side vertical walls, a pair of front and rear vertical walls and a slightly recessed upper horizontal wall defining a peripheral wall segment at least partially circumscribing the upper horizontal cart wall; comprising the steps of:

providing a plurality of interconnected panels, at least some of adjacent interconnected panels being foldably connected along respective fold lines or edges;

positioning a flexible central panel of the interconnected panels onto the upper horizontal wall of the cart in juxtaposed relation therewith;

extending a pair of upper side panels of the interconnected panels from the first central panel along the side vertical walls of the cart;

arranging first and second intermediate panels with respect to the peripheral wall segment of the cart, the first and second intermediate panels connecting the central panel to each of the upper side panels with first and second intermediate panels, the first intermediate panel foldably connected to a longitudinal edge of the central panel and defining a width generally corresponding in dimension to a height of the peripheral wall segment, the second intermediate panel foldably connected to the first intermediate panel and to the side panel and defining a width generally corresponding in dimension to the width of the peripheral wall segment; and disposing advertising media on an external viewing surface of at least one of the upper side panels.

13. The advertising method according to claim 12 wherein the central panel defines a pair of opposed longitudinal edges and a pair of opposed transverse edges and wherein the step of positioning includes extending the central panel such that the longitudinal edges are positioned adjacent the side vertical walls of the cart and the transverse edges are adjacent the front and rear vertical walls of the cart.

14. The advertising method according to claim 12 including the step of extending a pair of lower side panels from the upper side panels, at least one of the lower side panels having advertising media displayed on a viewing surface thereof.

15. The advertising method according to claim 12 including the step of folding the interconnected panels onto each other to assume a folded superposed condition, and placing the interconnected panels within a shelf of the cart for subsequent use thereof.

16. An apparatus for conveying information relating to commercial goods, and adapted for use with a cart of the type used in commercial travel, the cart having a general box like appearance with a pair of side vertical cart walls, a pair of front and rear vertical cart walls and a recessed upper horizontal cart which defines a peripheral wall segment at least partially circumscribing the upper horizontal cart wall, the apparatus comprising:

a plurality of generally flexible interconnected panels with at least some of adjacent panels being foldably connected along respective fold lines or edges, the respective fold lines or edges upon which the at least some of the adjacent panels fold being defined by connecting tabs which connect the at least some of the adjacent panels, including:

a centrally positioned panel adapted for placement adjacent the upper horizontal cart wall, the first centrally positioned panel defining a longitudinal axis and having opposed longitudinal edges and opposed transverse edges;

a pair of upper side panels adapted for placement adjacent the side vertical cart walls, the upper side panels having advertising media displayed on a viewing surface thereof; and first and second intermediate panels connecting each of the upper side panels with the centrally positioned panel, the first intermediate panel foldably connected to the longitudinal edge of the centrally positioned panel and defining a width generally corresponding in dimension to a height of the peripheral wall segment of the cart, the second intermediate panel foldably connected to the first intermediate panel and to the upper side panel and defining a width generally corresponding in dimension to the width of the peripheral wall segment of the cart.

17. The apparatus according to claim 1 wherein at least one of the first and second intermediate panels includes at least one fold line to selectively vary the width of the at least one of the first and second intermediate panels to accommodate variations in the height or width of the peripheral wall segment of the cart.

18. An advertising method for conveying advertising information on a cart of the type used in air travel, the cart having a general box like appearance with a pair of side vertical walls, a pair of front and rear vertical walls and a slightly recessed upper horizontal wall defining a peripheral wall segment at least partially circumscribing the upper horizontal cart wall; comprising the steps of:

providing a plurality of interconnected panels, at least some of adjacent interconnected panels being foldably connected along respective fold lines or edges;

positioning a flexible central panel of the interconnected panels onto the upper horizontal wall of the cart in juxtaposed relation therewith, the centrally positioned panel includes at least one fold line to selectively vary the width of the centrally positioned panel and folding the centrally positioned panel along the at least one fold line whereby the centrally positioned panel is received within the peripheral wall segment of the cart;

extending a pair of upper side panels of the interconnected panels from the first central panel along the side vertical walls of the cart;

arranging first and second intermediate panels with respect to the peripheral wall segment of the cart, the first and second intermediate panels connecting the central panel to each of the upper side panels with first and second intermediate panels, the first intermediate panel foldably connected to a longitudinal edge of the central panel and defining a width generally corresponding in dimension to a height of the peripheral wall segment, the second intermediate panel foldably connected to the first intermediate panel and to the side panel and defining a width generally corresponding in dimension to the width of the peripheral wall segment; and disposing advertising media on an external viewing surface of at least one of the upper side panels.

19. The advertising method according to claim 12 wherein at least one of the first and second intermediate panels includes at least one fold line to selectively vary the width of the at least one of the first and second intermediate panels, and wherein the step of arranging includes folding the at least one of the first and second intermediate panel along the at least one fold line to accommodate variations in the height or width of the peripheral wall segment of the cart.

20. An apparatus for conveying information relating to commercial goods, and adapted for use with a cart of the type used in commercial travel, the cart having a general box like appearance with a pair of side vertical cart walls, a pair of front and rear vertical cart walls and an upper horizontal surface, the apparatus comprising:

a plurality of generally flexible interconnected panels with at least some of adjacent panels being interconnected through a plurality of discrete and spaced connecting tabs separated by slots, the connecting tabs dimensioned to displace the adjacent panels relative to each other to facilitate folding of the adjacent panels, including:

a centrally positioned panel adapted for placement adjacent the upper horizontal cart wall, the centrally positioned panel defining a longitudinal axis and having opposed outer longitudinal edges and opposed outer transverse edges, the centrally positioned panel further having at least one fold line to selectively vary one of the length or the width of the centrally positioned panel so as to be received on the upper horizontal surface of the cart;

a pair of upper side panels operatively connected to the centrally positioned panel and dimensioned and adapted for placement adjacent the side vertical cart walls, the upper side panels having advertising media displayed on a viewing surface thereof; and whereby the dimensioning of the centrally positioned panel is adjustable through the at least one fold line to permit the centrally positioned panel to be placed in juxtaposed relation to the upper horizontal surface of the cart.

21. The apparatus according to claim 1 wherein the interconnected panels are adapted to fold onto each other to assumed a folded condition for storage within a shelf of the cart.

* * * * *